United States Patent
Muquet

(10) Patent No.: US 8,032,087 B2
(45) Date of Patent: Oct. 4, 2011

(54) METHOD OF DETECTING INTERFERENCE IN A COMMUNICATION SIGNAL

(75) Inventor: Bertrand Muquet, Paris (FR)

(73) Assignee: Sequans Communications, Paris (FR)

( * ) Notice: Subject to any disclaimer, the term of this patent is extended or adjusted under 35 U.S.C. 154(b) by 697 days.

(21) Appl. No.: 11/525,531

(22) Filed: Sep. 22, 2006

(65) Prior Publication Data

US 2007/0077892 A1  Apr. 5, 2007

(30) Foreign Application Priority Data

Sep. 28, 2005 (EP) ..................... 05292021

(51) Int. Cl.
*H04B 17/00* (2006.01)
*H04B 15/00* (2006.01)
*H04B 1/00* (2006.01)

(52) U.S. Cl. .................. 455/67.13; 455/67.11; 455/63.1

(58) Field of Classification Search ............... 455/67.13, 455/67.11, 67.14, 67.16, 115.1, 115.2, 115.4, 455/63.1, 226.1, 226.4, 283, 296, 501, 570; 342/165

See application file for complete search history.

(56) References Cited

U.S. PATENT DOCUMENTS

2003/0107512 A1  6/2003  McFarland et al.
2004/0033789 A1  2/2004  Tsien

FOREIGN PATENT DOCUMENTS

EP         1 515 488 A    3/2005
WO    WO 2004/047308 A    6/2004

OTHER PUBLICATIONS

European Search Report for EP 05 29 2021 dated Mar. 28, 2006.

*Primary Examiner* — Eugene Yun
(74) *Attorney, Agent, or Firm* — Kevin D. Jablonski; Graybeal Jackson LLP

(57) ABSTRACT

A method of detecting at least a radar signal in an incoming signal received by a wireless communication system, comprising the steps of obtaining a measurement of said incoming signal during a measurement duration proportional to a known pulse duration of a known radar signal, performing a first comparison between said measurement and a first threshold, performing an intermediate test if said measurement exceeds said first threshold, characterized in that it further includes the step of performing a second comparison between said measurement and a second threshold if said measurement exceeds said first threshold, said second threshold being greater than said first threshold, and in that said intermediate test is only conditionally performed if said measurement exceeds said second threshold.

11 Claims, 1 Drawing Sheet

METHOD OF DETECTING INTERFERENCE IN A COMMUNICATION SIGNAL

PRIORITY CLAIM

This application claims priority from European patent application No. 05 292 021.2, filed Sep. 28, 2005, which is incorporated herein by reference.

TECHNICAL FIELD

An embodiment of the present invention relates to wireless communications systems operating in license-exempt bands, in which radar and different types of communication networks coexist, and in which dynamic channel selection or dynamic frequency selection (DFS) is required to avoid interference from/to other networks and radar signals.

More specifically, an embodiment of the present invention relates to a method of detecting potential interference radar signal in an incoming signal received by a wireless communication system.

BACKGROUND

The development of wireless communication networks making use of the 5 GHz frequency bands was initially restrained because these bands were originally reserved for use by radar systems. Recently, the coexistence between radars and communication systems in a 5 GHz frequency bands has been studied and regulatory offices have allowed systems such as Wireless Local Area Networks (WLANs) to use these bands under strict rules to be conformed with.

More precisely, equipment operating in the 5 GHz frequency bands may have dynamic frequency selection (DFS) capability. Dynamic frequency selection (DFS) is the mechanism that has been devised to enable operation of wireless equipments, for example wireless local area networks (WLANs) based on the HIPERLAN2 and IEEE802.11a/b/g/h standards (which are incorporated by reference), in the 5 GHz frequency bands without causing harmful interference to radar systems operating in those bands. The main principle of DFS is that devices operating in the 5 GHz frequency bands shall be capable of detecting radar signals and shall avoid the channels used by radars.

The principle of DFS is described in the International Telecommunication Union (ITU) recommendation (ITU-R M.1652) and the regulatory requirements for Europe can be found in the Conference of European Postal and Telecommunications (CEPT) decision ERC/DEC/(04)08 (all of which are incorporated by reference).

In order to comply with regulatory requirements, systems using license-exempt bands, such as IEEE 802.11 wireless local area networks and IEEE 802.16 wireless access networks, have introduced messages in the Media Access Control (MAC) protocol enabling operation of DFS. However, the mechanism to perform the detection of radar and of other communication systems is not defined by any of these standards and is left to the system manufacturer.

Though not all of them are explicitly stated, the main requirements for the DFS mechanism are:

The DFS and radar detector shall be capable to quickly detect radar, an order of magnitude being 0.2 s, above a given power level with a very low non-detection probability.

The DFS and radar detector shall be performed both during silent periods of the 5 GHz wireless systems and also during their active periods.

The DFS and radar detector shall be very reliable in the sense that the probability of false detection, such as detecting a radar if no radar is actually present, shall be negligible, because a channel on which a radar has been detected shall no longer be used for 30 minutes.

The DFS and radar detector shall be capable to detect the use of a channel by another wireless transmission system, for example Wireless Local Area Network (WLAN) or Wireless Metropolitan Area Network (WMAN) system.

Dynamic frequency selection (DFS) mechanisms and conformance tests for coexistence in the 5 GHz frequency bands have been standardized and published only very recently. As a consequence, little information on the subject is available in the open literature.

The most relevant solutions in the state-of-the-art are described in the applications US 2003/0107512 concerning a "radar detection and dynamic frequency selection for wireless local area networks", and in the application US 2004/0033789 concerning a "dynamic frequency selection and radar detection with a wireless LAN". Both of these applications are incorporated by reference.

The application US 2003/0107512 presents an exhaustive study of the problems raised by DFS and radar detection. However, it does not propose any practical solution to do it, and it only lists all the possible tools that a designer can rely on to design radar detector. All these tools are very classical and known by any skilled in the art person working in the field, for example time domain analysis, spectral analysis, Fast Fourier Transform. Besides, it never really explained clearly how to detect radar in practice.

The application US 2004/0033789 presents a mechanism based on a video detector and a complicated analysis. This implementation is hardly possible in practice and cannot be used in an embedded system.

As a consequence, the existing methods fall short of fulfilling the requirements of a practical Dynamic Frequency Selection (DFS) solution, and no existing method seems to be practically implemented and straightforwardly put in practice.

SUMMARY

One embodiment of the invention is a method exempt from at least one of the drawbacks previously mentioned.

For this purpose, an embodiment of the invention is a method of detecting potential interference of at least a radar signal in an incoming signal received by a wireless communication system, said radar signal being a pulse train defined by a pulse repetition period, called radar period, and by a pulse duration, this method comprising the steps of:

obtaining a measurement of said incoming signal during a measurement duration proportional to a known pulse duration of a known radar signal;

performing a first comparison between said measurement and a first threshold;

performing an intermediate test if said measurement exceeds said first threshold.

A method according to an embodiment of the invention is mainly characterized in that it further includes the step of performing a second comparison between said measurement and a second threshold if said measurement exceeds said first threshold, said second threshold being greater than said first threshold, and in that the intermediate test is only conditionally performed if said measurement exceeds said second threshold.

Preferably, said intermediate test is performed if a first number is at least equal to a first value, said first number representing the number of measurements exceeding said second threshold, said first value being an integer representing the minimum number of measurements to be taken into account before performing the intermediate test.

The method may include the step of storing a serial number and an instant of occurrence of each measurement exceeding said second threshold.

For instance, the method may also include the steps of:

counting the number of measurements exceeding said first threshold, represented by a second number, before performing the detailed test; and performing a final test consisting in comparing a duration of a set of instants of occurrence previously stored, to at least a known radar period among a listed radar periods, when said second number is smaller than $\alpha$ times said first number, where $\alpha$ is a predetermined coefficient representing the reliability of the detection process.

The method may further include the step of generating a radar detection signal when said duration of said set of instants of occurrence previously stored corresponds with a known radar period.

If said first number is at least equal to a second value, said second value being an integer greater than said first value and at least equal to a minimum number of pulses in a pulse train of a known radar signal, then said intermediate test can comprise the step of performing a third comparison between a first difference and a first duration, said first difference being the difference between an instant of occurrence corresponding to a Nth measurement exceeding said second threshold, and an instant of occurrence corresponding to a first measurement exceeding said second threshold, said first duration being at least equal to a minimum known radar period.

If said first number ranges between said first value and said second value, said intermediate test can comprise the step of performing a fourth comparison between a second difference and said first duration, said second difference being the difference between an instant of occurrence corresponding to a Kth measurement exceeding said second threshold, and said instant of occurrence corresponding to said first measurement exceeding said second threshold.

Preferably, said final test is only conditionally performed if said first difference or said second difference exceeds said first duration, and when said second number is smaller than $\alpha$ times said first number.

If said first number is at least equal to said second value, said intermediate test can comprise the step of performing a fifth comparison between said first difference and a second duration, said second duration being smaller than said first duration.

Preferably, said third and/or fourth comparisons are performed only when said first difference is at least equal to said second duration.

Preferably, each time said measurement exceeds said second threshold, the next measurements S are skipped without being processed, where S is an integer greater than 1.

Thus, one or more embodiments of the invention can be implemented efficiently using a very simple and low cost architecture, and can distinguish radar from other transmissions.

Another advantage of an embodiment of the invention is that it can be easily adapted to a wide range of transmission systems, and to a wide range of radar signals to be detected.

An embodiment of the invention enables to detect radar in periods of silence and in periods of traffic by using appropriate parameters.

Another advantage of an embodiment of the invention is that it has a low complexity, it performs several reductions of the amount of power measurements to be processed, and avoids unrequired analysis of the power measurements.

BRIEF DESCRIPTION OF THE DRAWINGS

Other features and advantages will appear more clearly from the description of one embodiment of the invention made hereinafter, as an indication and by no means restrictive, with reference to FIG. 1 which is a flowchart of a method of detecting radar signal in accordance with one embodiment of the present invention.

DETAILED DESCRIPTION

Figure 1:
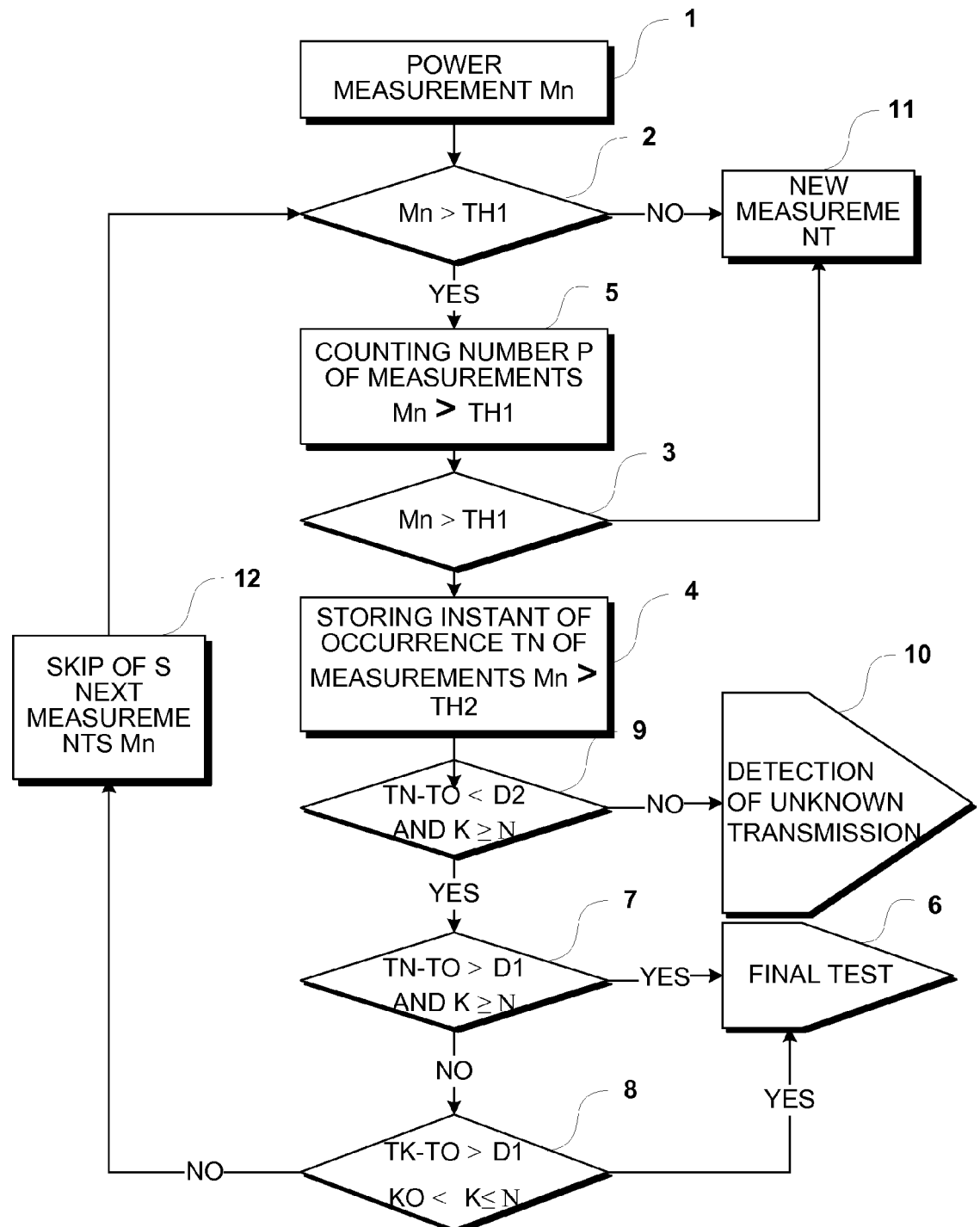

A radar signal can comprise a sequence of radar pulses, also called pulse train of radar, transmitted periodically. Due to the very specific nature of radar signals, the method relies on an individual pulse detector. The radar detector is based on measurements Mn obtained at a measurement duration Ts that can be set depending on the environment, the system and the radars to be detected.

The measurement duration Ts is for example set around the measurement duration recommended by the regulation and standards authorities concerned with radar detection, for example the European Telecommunication Standard Institute (ETSI).

The measurement Mn can be a simple measurement such as a power measurement, a signal-to-noise ratio (SNR) measurement, a codeword error rate measurement, a bit error rate (BER) measurement, or a combination of simple measurements.

Indeed some measurements are more appropriate for detection of a radar in silence periods while others are best suited for radar detection in traffic periods. For instance, power measurements are particularly suited in the first case, but it is possible to use either power measurements, or SNR and BER measurements, or a combination of them in the second case.

In the following description of one embodiment of the invention, we consider power measurements for simplicity but the description also applies to other measurements, with some minor modifications, which will be clear to the man skilled in the art, for example by changing the sense of thresholds comparisons.

Referring now to FIG. 1, the method of detecting radar pulses, according with one embodiment of the present invention, comprises overall a first comparison (in 2), a second comparison (in 3), an intermediate test, and a final test (in 6).

A power measurement Mn of an incoming signal received by a wireless communication system is obtained (in 1) at the power measurement duration Ts recommended by standards authorities concerned with radar detection, a standard value being for example one microsecond.

A first comparison (in 2) is then performed between an individual power measurement Mn and a first threshold TH1. If the measurement Mn exceeds the first threshold TH1, then a number P, representing the number of measurements Mn exceeding this first threshold TH1, is incremented and accumulated over a radar detection period. Otherwise the process of a next measurement (in 11) starts.

In case the measurement Mn exceeds the first threshold TH1, meaning that a pulse has been detected, and in order to discriminate potential radar signals from other transmissions, a second comparison (in 3) between said measurement Mn and a second threshold TH2 is performed, the second threshold TH2 being greater than the first threshold TH1.

If the measurement $M_n$ exceeds the second threshold TH2, then the following steps are performed:

a number K, representing the number of measurements exceeding the second threshold TH2, is incremented and accumulated over the radar detection period, an instant of occurrence $T_n$ of each measurement $M_n$ exceeding the second threshold TH2, and consequently of each detected pulse, is stored (in 4) in a memory, and, optionally, the corresponding measurements are also stored.

Otherwise the process of a next measurement (in 11) starts.

Using a double threshold mechanism enables to significantly reduce the analysis complexity and the number of detected pulses to be stored and processed.

In order to limit storage requirements of a set of instants of occurrences, a First In First Out (FIFO) memory can be used with a size limited to a value N. The value N is set around a number of pulses in the pulse train of a known radar signals listed in a standard table of radar signals. When a new instant of occurrence $T_n$ have to be stored in the memory in a FIFO manner, the new instant of occurrence is placed on top of the free memory spaces and if the memory is full, the memory elements are simply shifted to delete the oldest instant of occurrence and free some place for the new instant of occurrence. The method can also be implemented using a classical memory and is not restricted to FIFO memories.

The intermediate test is performed each time a measurement $M_n$ exceeds the second threshold TH2, and consists, for example, in elementary tests performed with the instants of occurrence previously stored in the memory.

The point in doing the intermediate test is that it enables to perform the last test only when it is absolutely required.

The intermediate test may consist in four elementary tests.

When the number K is at least equal to the value N, a first elementary test of the intermediate test is performed. This first elementary test may consist in detecting that the incoming signal cannot obviously be a radar signal. This is done by testing that detected pulses are not sufficiently spaced to be pulses of a pulse train of radar, and it is defined by a fifth comparison (in 9) between a first difference $T_N-T_0$ and a duration D2.

The duration D2 is, for example, smaller than a known radar period. The first difference $T_N-T_0$ is the difference between an instant of occurrence of a Nth measurement exceeding the second threshold TH2, and the instant of occurrence of the first measurement exceeding the second threshold TH2.

This first elementary test may be summarized by: $T_N-T_0<D2$ and $K \geq N$.

If the first difference $T_N-T_0$ is greater than duration D2, then the incoming signal is obviously not a radar signal, and the detection of an unknown transmission is reported (in 10).

A second elementary test of the intermediate test may consist in detecting that an incoming signal may be a radar signal. This happens when there are enough pulses with such a spacing that they may correspond to radar pulses. This second elementary test consists in performing a third comparison (in 7) between the first difference $T_N-T_0$ and duration D1, when number K is at least equal to value N. The duration D1 is greater than the duration D2 and is at least equal to a minimum known radar period.

This second elementary test may be summarized by: $T_N-T_0>D1$ and $K \geq N$.

A third elementary test of the preliminary analysis consists in testing that no new pulses have been received recently and that the final test shall be forced since the detected pulses may correspond to a radar signal. This third elementary test consists for example in performing a fourth comparison (in 8) between a second difference $T_K-T_0$ and duration D1, when the number K ranges between a first value K0 and the value N. The first value K0 is an integer smaller than the value N, and representing the minimum number of measurements to be taken into account before performing the intermediate test. The second difference $T_K-T_0$ is the difference between an instant of occurrence of the Kth measurement exceeding the second threshold TH2, and the instant of occurrence of the first measurement exceeding the second threshold TH2.

This third elementary test may be summarized by: $T_K-T_0>D1$ and $K0<K \leq N$.

If the second or the third elementary test is successful, meaning that the first difference $T_N-T_0$ is greater than duration D1 and number K is at least equal to value N, or that the second difference $T_K-T_0$ is greater than duration D1 and number K ranges between the first value K0 and value N, a fourth elementary test may be performed.

This fourth elementary test consists in testing that the distribution of the measurements with respect to the first and second thresholds TH1 and TH2 cannot be that of a radar signal. It consists in comparing number P and α times number K, where α is a predetermined coefficient representing the reliability of the detection process, and is related to false alarm and non detection probabilities. α is for example set between 1 and 10.

This fourth elementary test may be summarized by: $\alpha K>P$.

The final test (in 6) is triggered when α times number K is greater than number P. Otherwise the detection of an unknown transmission is reported.

This mechanism allows to test, for example, that the peak-to-average power ratio (PAPR) or the power measurement distribution differs from that of a radar. Especially, it avoids computing quantities such as histograms, cumulative density, average values or standard deviations of the measurements.

The final test (in 6) consists in comparing a duration of a set of instants of occurrence previously stored, to at least a known radar period among the listed radar signals.

This final test (in 6) takes into account the fact that there may be false alarms and non detections among the set of detected pulses. A possible way to achieve it simply for each radar signal to be detected is to count the couples of pulses that correspond to the radar period or an integer multiple of the radar period, with an error margin to account for the inherent inaccuracy of the measurement process, and decide that a radar is present if enough couples of pulses corresponding to the period are found. This algorithm can be summarized as follows, but many variants of this algorithm may be derived so that the final test is not limited to this scheme:

for each known radar signal to be detected, let us consider the pulses duration of the pulses train of the radar, for each possible couple of instants of occurrence in the FIFO, if the difference between two instants of occurrence corresponds to the radar period or an integer multiple of the radar period, increment a counter C, when all couple of instants of occurrence have been tested, decide that the radar has been detected if the counter C is greater than a predetermined threshold.

To reduce the size of measurements to be processed, each time a measurement $M_n$ exceeds the second threshold TH2, the next S measurements are not processed (in 12) if the intermediate test is not successful, S being an integer greater than 1. This enables to reduce the size of data to be processed and the computational complexity by a factor S at the price of a negligible accuracy loss in the pulse position determination. S is for example typically chosen between 5 and 50. This mechanism enables to implement the first comparison in hardware and the rest of the method in software. Actually, the invention is not limited to this specific split between hardware and software and also covers other splits. Besides, the method can be fully implemented in hardware or in software.

Variants of the invention can be derived by suppressing some of the tests of the intermediate test, using different measurements and/or modifying the final test algorithm.

One or more embodiments of the invention apply to any system requiring radar detection mechanisms including, but not limited to:

Wireless Metropolitan Area Networks (WMANs) based on the IEEE 802.16 or the ETSI Hiperman specifications, which are incorporated by reference, Wireless Local Area Networks (WLANs) based on the IEEE802.11 or the ETSI Hiperlan2 specifications, which are incorporated by reference, Other wireless systems making use of license-exempt frequency bands.

From the foregoing it will be appreciated that, although specific embodiments of the invention have been described herein for purposes of illustration, various modifications may be made without deviating from the spirit and scope of the invention.

The invention claimed is:

1. A method of detecting potential interference of at least a radar signal in an incoming signal received by a wireless communication system, said radar signal being a pulse train defined by a pulse repetition period, called radar period, and by a pulse duration, this method comprising the steps of:
    obtaining a measurement of said incoming signal during a measurement duration proportional to a known pulse duration of a known radar signal;
    performing a first comparison between said measurement and a first threshold;
    counting the number of measurements exceeding said first threshold to generate a first count;
    performing a second comparison between said measurement and a second threshold if said measurement exceeds said first threshold, said second threshold being greater than said first threshold,
    if said measurement exceeds said first and second thresholds, performing conditionally an intermediate test to check if the incoming signal corresponds to a radar signal or to an unknown signal by using at least said first and second counts, and
    if the incoming signal corresponds to a radar signal, performing a final test to identify the radar signal among a plurality of known radar signals.

2. Method according to claim 1, wherein said intermediate test is performed if said second count is at least equal to a first value, said first value being an integer representing the minimum number of measurements to be taken into account before performing the intermediate test.

3. Method according to claim 2, further including, before performing said intermediate test, the step of storing a serial number and an instant of occurrence of each measurement exceeding said second threshold.

4. The method according to claim 3,
    wherein the final test consists in comparing a duration of a set of instants of occurrence previously stored, to at least a known radar period among a listed radar periods, when said first count is smaller than $\alpha$ times said second count,
    where $\alpha$ is a predetermined coefficient representing the reliability of the detection process.

5. Method according to claim 4, further including the step of generating a radar detection signal when said duration of said set of instants of occurrence previously stored corresponds with a known radar period.

6. Method according to claim 5, wherein if said second count is at least equal to a second value, said second value being an integer greater than said first value and at least equal to a minimum number of pulses in a pulse train of a known radar signal, then said intermediate test comprises the step of performing a third comparison between a first difference and a first duration, said first difference being the difference between an instant of occurrence corresponding to a Nth measurement exceeding said second threshold, and an instant of occurrence corresponding to a first measurement exceeding said second threshold, said first duration being at least equal to a minimum known radar period.

7. Method according to claim 6, wherein if said second count ranges between said first value and said second value, said intermediate test comprises the step of performing a fourth comparison between a second difference and said first duration, said second difference being the difference between an instant of occurrence corresponding to a Kth measurement exceeding said second threshold, and said instant of occurrence corresponding to said first measurement exceeding said second threshold.

8. Method according to claim 7, wherein said final test is only conditionally performed if said first difference or said second difference exceeds said first duration, and when said first count is smaller than $\alpha$ times said second count.

9. Method according to claim 8, wherein if said second count is at least equal to said second value, said intermediate test comprises the step of performing a fifth comparison between said first difference and a second duration, said second duration being smaller than said first duration.

10. Method according to claim 9, wherein said third and/or fourth comparisons are performed only when said first difference is at least equal to said second duration.

11. Method according to claim 1, wherein each time said measurement exceeds said second threshold, the next S measurements are skipped without being processed, where S is an integer greater than 1.

* * * * *